United States Patent [19]

Carpenter et al.

[11] Patent Number: 5,481,921
[45] Date of Patent: Jan. 9, 1996

[54] SNAP-FIT ASSEMBLY OF DIRECT DRIVE BOURDON TUBE PRESSURE GAUGE

[75] Inventors: David M. Carpenter, Berea; Thomas M. Philyaw; Arthur P. Pandaru, both of Richmond, all of Ky.

[73] Assignee: Dresser Industries, Inc., Dallas, Tex.

[21] Appl. No.: 390,496

[22] Filed: Feb. 17, 1995

[51] Int. Cl.⁶ .................................................. G01L 7/04
[52] U.S. Cl. ................................ 73/743; 73/431; 73/732
[58] Field of Search ........................... 73/732, 741, 742, 73/743, 146.8, 431; 368/296, 294, 80, 228, 232

[56] References Cited

U.S. PATENT DOCUMENTS

| | | | |
|---|---|---|---|
| 3,175,531 | 3/1965 | Du Bois | 116/129 |
| 3,277,722 | 10/1966 | Huston | 73/743 |
| 3,630,089 | 12/1971 | Bissell | 73/431 |
| 3,641,820 | 2/1972 | Bissell | 73/418 |
| 4,161,888 | 7/1979 | Bissell | 73/740 |
| 4,337,664 | 7/1982 | Kipp et al. | 73/741 |
| 4,545,256 | 10/1985 | Ferguson | 73/738 |
| 4,753,112 | 6/1988 | Wetterhorn et al. | 73/431 |
| 5,416,475 | 5/1995 | Tolbert et al. | 73/431 X |

*Primary Examiner*—Richard Chilcot
*Assistant Examiner*—Joseph L. Felber
*Attorney, Agent, or Firm*—Daniel Rubin

[57] ABSTRACT

A pressure gauge is disclosed includes a snap-in interfit between a window and case and between the case and socket. A coiled Bourdon tube within the case directly drives a pointer located intervening between the window and a dial retained by the window.

10 Claims, 3 Drawing Sheets

5,481,921

SNAP-FIT ASSEMBLY OF DIRECT DRIVE BOURDON TUBE PRESSURE GAUGE

FIELD OF THE INVENTION

The field of art to which the invention relates comprises gauge instruments for the measuring and indicating of pressure values of a fluid to which the gauge is operatively exposed.

BACKGROUND OF THE INVENTION

Pressure gauges are widely utilized in a myriad of different environments for commercial and industrial applications where measuring and indication of fluid pressure values is required. The value of pressures can be displayed in either digital or analog form. The primary sensing element of the gauge typically comprises a Bourdon tube that incurs a predictable displacement in response to pressure changes to which it is exposed. Depending on construction, tube displacement can be translated via a movement to rotate a pointer opposite a calibrated dial or alternatively, a coiled Bourdon tube can carry the pointer directly from its displacement end for arcuate displacement opposite the dial.

Exemplifying analog pressure gauges of the prior art are U.S. Pat. Nos. 3,630,089 that discloses a pointer mounted directly on the Bourdon tube and 4,361,046 disclosing use of a movement intervening between the displacement end of the Bourdon tube and the indicating pointer. In general, the face of such gauges vary in diameter from at least one inch and above. They typically are mass produced in high volume quantities for highly competitive markets, such that even a slight saving in production cost can result in a substantial saving to the manufacturer.

OBJECTS OF THE INVENTION

It is an object of the invention to provide a novel construction of pressure gauge with an outside diameter of less than about one inch.

It is a further object of the invention to fabricate a pressure gauge of the previous object in a highly economical manner.

It is a still further object of the invention to achieve the foregoing objects utilizing a relatively low component count and a highly simplified assembly procedure.

SUMMARY OF THE INVENTION

This invention relates to gauge apparatus for indicating values of fluid pressure to which the gauge is exposed. More specifically, the invention relates to a pressure gauge utilizing a highly compact construction while incurring relatively low production cost.

For achieving the foregoing, the pressure gauge of the invention utilizes a dial secured in a snap-in relation to the window, a plastic case that receives both the socket and window in a snap-in relation, a spiral Bourdon tube, and a pointer directly connected to the displacement end of the Bourdon tube. The pointer is of a double back configuration so as to afford a uniform weight distribution on the Bourdon tube. By virtue of its design, the pressure gauge can be fabricated with window diameters of less than about one inch while permiting calibration by simply displacing the dial window assembly arcuately relative to the socket.

The above noted features and advantages of the invention as well as other superior aspects thereof will be further appreciated by those skilled in the art upon reading the detailed description that follows in conjunction with the drawings.

DESCRIPTION OF THE PREFERRED EMBODIMENT

Figure 1:
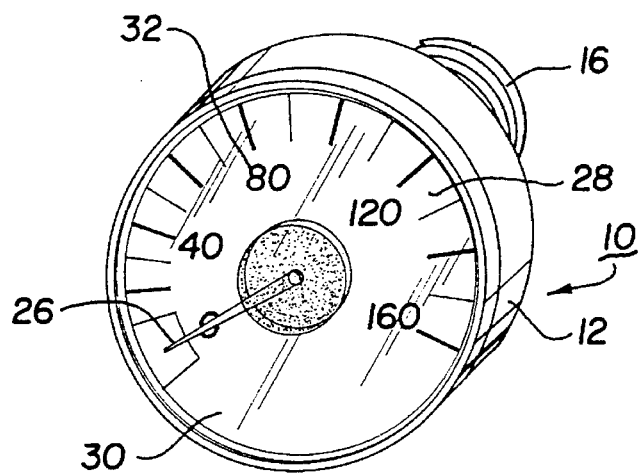
FIG. 1 is a frontal isometric view of gauge constructed in accordance herewith.

In the description which follows, like parts are marked throughout the specification and drawings with the same reference numerals respectively. The drawing figures are not necessarily to scale and in certain views, parts may have been exaggerated for purposes of clarity.

Figure 2:
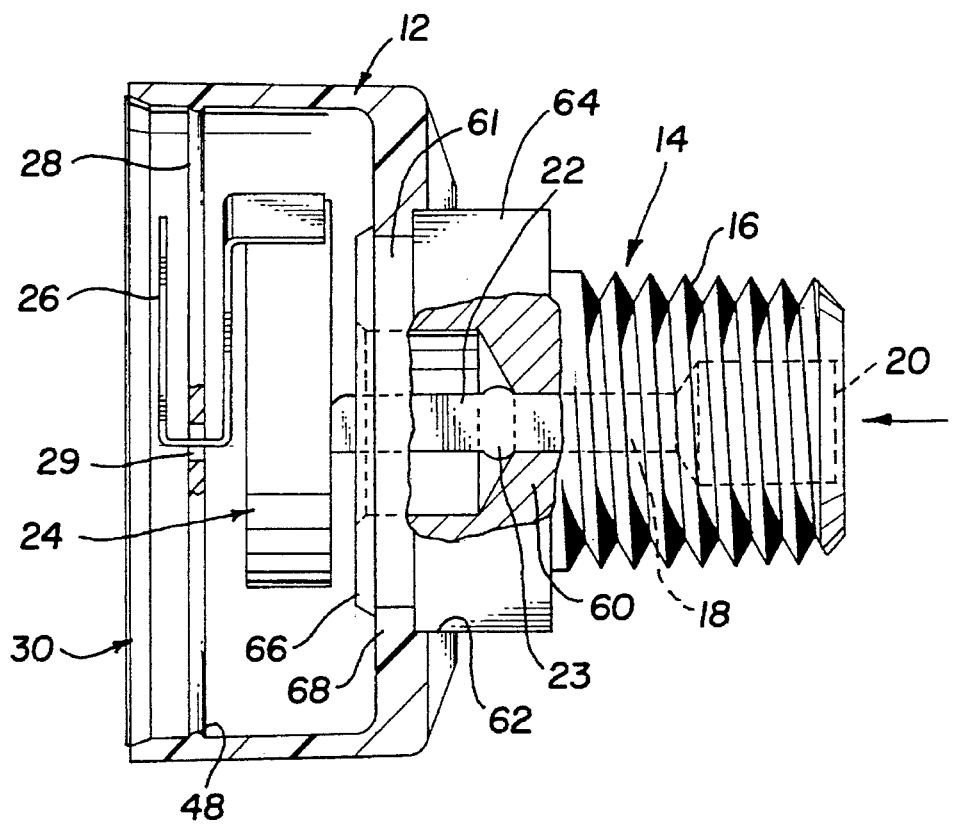
FIG. 2 is an enlarged partially sectioned view of the gauge of FIG. 1.
Figure 3:
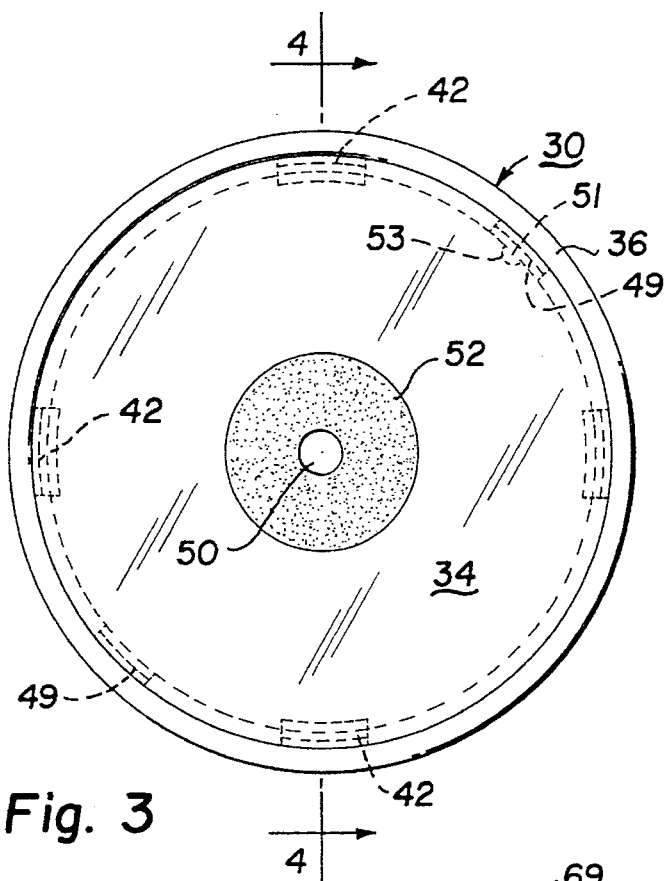
FIG. 3 is a front elevation view of the window and dial assembly hereof.
Figure 4:
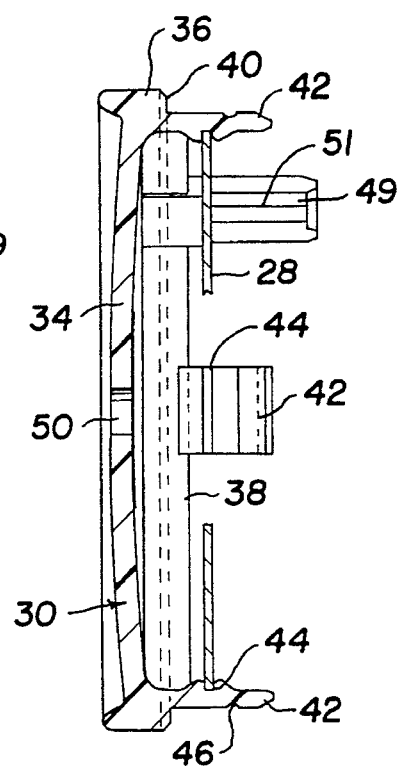
FIG. 4 is a sectional elevation view as seen substantially along the lines 4—4 of FIG. 3.

Referring now to the drawings, the gauge hereof as shown in FIGS. 1 and 2 is designated 10 and is comprised of a case 12 interfitting with a socket 14 having a threaded stem 16 for mounting the gauge into a threaded aperture from which fluid pressure measurements are to be obtained. A concentric bore 18 extends within socket 14 from an inlet opening 20 while supporting the inlet 21 to Bourdon tube 22 coiled at 24 within case 12. The displacement end of the Bourdon tube supports a U-shaped reverse bend pointer 26 opposite a dial 28. Protecting the pointer while supporting the dial is a transparent window 30 that cooperates with case 12 to enclose both dial and pointer. Changes in pressure values received at inlet 20 will cause pointer 26 to be displaced with respect to graduations 32 for indicating the value of fluid pressure being received.

window 30, as can be best understood with reference to FIGS. 3 and 4, is comprised of a completely integral unit including a transparent face 34 joined about its perimeter to an annular rim 36. At the underside of the window is an annular rim 38 of relatively reduced diameter so as to define a shoulder 40 adapted to seat on case 12 as will be understood. Open aperture 50 serves as a safety vent while circular translucent etch 52 serves to conceal underlying structure thereat. In a preferred embodiment, window 30 is comprised of a molded polymeric plastic composition such as polycarbonate.

For supporting dial 28 there is provided a plurality of elongated laterally extending fingers 42 arcuately displaced about rim 38. Within each finger there is provided a retaining groove 44 in which to receive and secure the dial in a snap-in resilient hold thereat. External recesses 46 in fingers 42 are adapted to interfit with internal case rib 48 for affecting a snap-in assembly therewith as will be understood. A pair of oppositely positioned fingers 49 likewise extend laterally from rim 38 and serve as a locator for automatic assembly to guide positioning of window 30 within case 12. Bead 51 on one finger 49 engages a notch 53 on the dial to effect an interlocked orientation therebetween.

Figure 5:
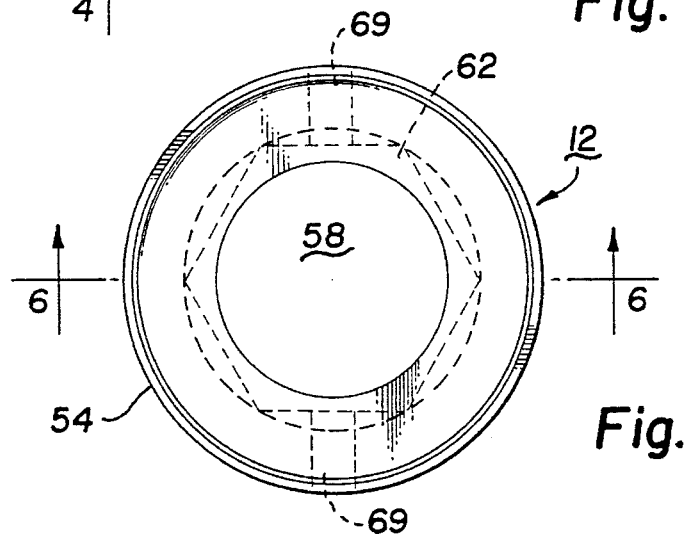
FIG. 5 is a frontal elevation view of the case utilized in the gauge hereof.
Figure 6:
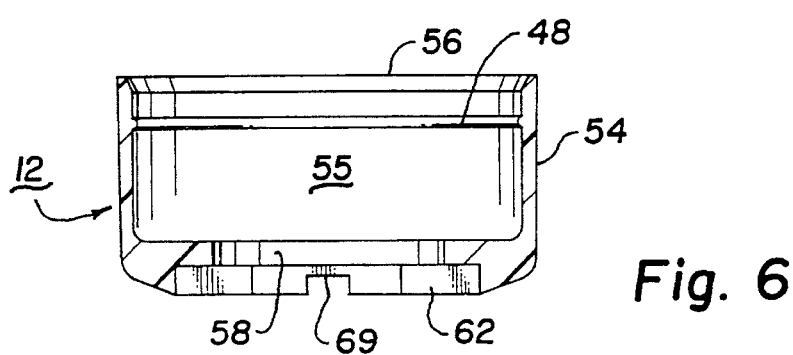
FIG. 6 is a sectional elevation view as seen substantially along the lines 6—6 of FIG. 5.
Figure 7:
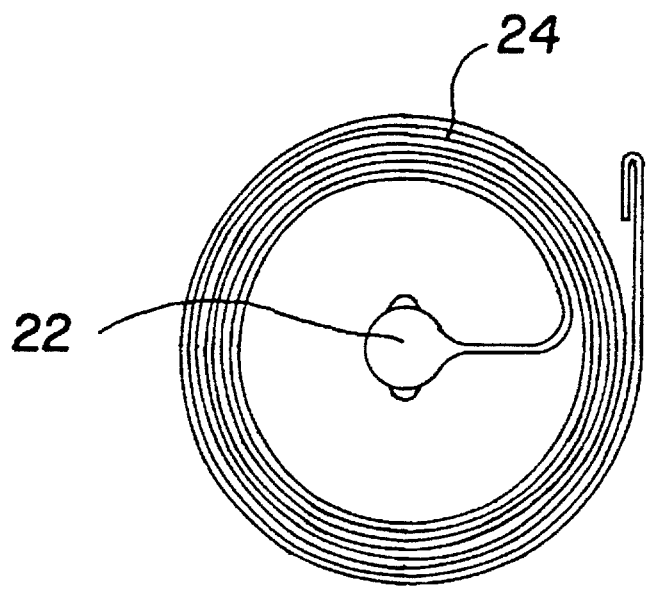
FIG. 7 is a plan view of a spiral coiled Bourdon tube as utilized herein.

Referring now to FIGS. 5 and 6, case 12 is comprised of a suitable chemical resistant plastic such as nylon with a fiber fill and is configured as a cup shaped annular shell 54 defining an internal cavity 55. A front opening 56 serves to receive window 30 while a rear aperture 58 serves to receive the forward penetrating end of socket body 60. Coaxially formed behind case wall opening 58 at the rear exterior of case shell 54 is a polygonal recess 62 in which to receive and rotationally interlock the wrench hex 64 of socket 14. Permitting a snap-in assembly while securing the socket and casing against withdrawal separation is an annular socket lip 66 that bears against the inward face of rear case wall 68 interfitting within annular recess 61. Opposite slots 69 serve as locators for automatic assembly.

Figure 8:
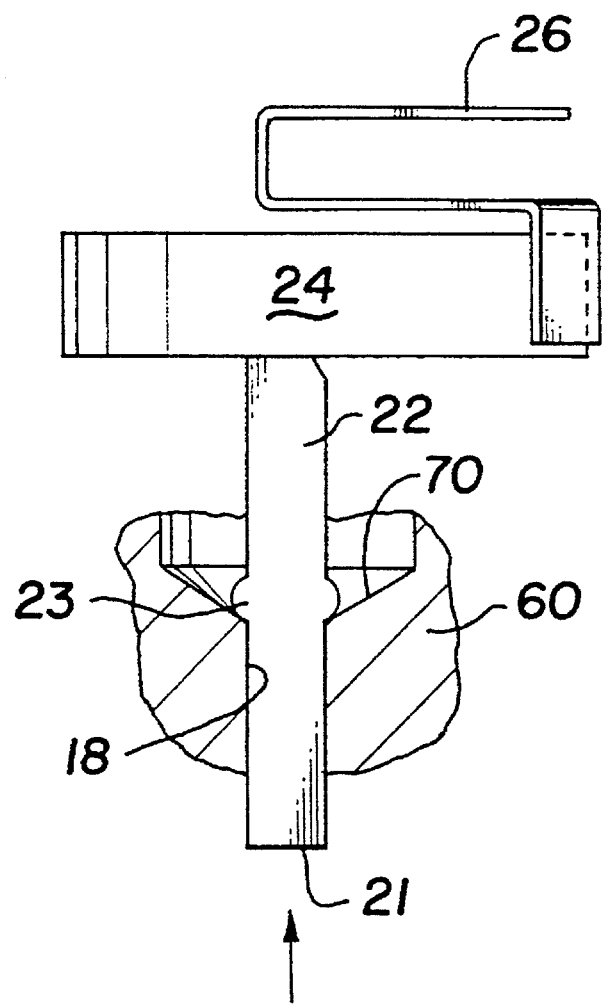
FIG. 8 is a side elevation view partially sectioned illustrating assembly of the Bourdon tube with attached pointer.

Assembly of the components in fabricating the gauge hereof is relatively simple in that socket 14 can be secured to case 12 in a snap-in arrangement by forcing the rear of case 12 past lip 66 until seating about annular recess 61. Simultaneous therewith hex recess 62 receives socket wrench flats 64 in a rotational interlock with case 12. With the socket and case secured together, the receiving end 21 of Bourdon tube 22 is inserted into bore 18. Tube enlargement 23, when inserted into socket bore 18, seats against conical bore surface 70 for limiting inward insertion of tube 22 (FIG. 8).

The dial/window assembly is created by snapping the dial into retaining grooves 44 of window fingers 42 with bead 51 seated in dial notch 53. Pointer 26, while secured to Bourdon tube 22, is then extended through dial aperture 29 while the dial and window sub assembly are forced into case 12 until finger grooves 46 seat on case rib 48. In this relation, the window and dial are retained together and can be arcuately rotated after assembly for purposes of instrument calibration. The latter is achieved by subjecting the Bourdon tube to a known pressure point and then rotating the dial until the pointer is opposite the correct graduation 32. Once calibrated, the window is joined to the case using ultrasonic or chemical welding.

By the above description there is disclosed a novel pressure gauge construction that is easily assembled and can include outside dimensions of window 30 less than one inch. That dimension is highly preferred in a variety of applications requiring the smallest possible pressure instrument. At the same time, the gauge retains the appearance of a conventional gauge, i.e. standard layout with lens, pointer, dial, case, etc. By virtue of at least the window and case being formed of molded plastic compositions, the costs therefor are minimized while the snap-in relations between assembled components result in a reduced number of component parts that significantly reduce the relative cost of assembly.

Utilized in the construction hereof is a unique form of pointer utilizing a double back or reverse bend that distributes the pointer weight evenly about the spiral Bourdon tube to thereby eliminate or at least minimize a tendency of tube tilting. This feature is especially important for low pressure gauges in which tilting can otherwise introduce error in the represented pressure measurements.

Since many changes could be made in the above construction and many apparently widely different embodiments of this invention could be made without departing from the scope thereof, it is intended that all matter contained in the drawings and specification shall be interpreted as illustrative and not in a limiting sense.

We claim:
1. A pressure gauge comprising:
   a dial containing graduations of pressure values;
   a transparent window including means for supporting said dial and providing a face affording viewing capability of the dial;
   a Bourdon tube supported coiled behind said dial and operable to effect displacement changes in response to pressure changes in a fluid to which it is exposed;
   a pointer secured to said Bourdon tube for displacement therewith and extending to between said window and said dial for pointing to graduations corresponding to values of pressure being sensed by said Bourdon tube;
   a case internally enclosing at least the coiled portion of said Bourdon tube and assembled to said window in a snap-in relation therewith; and
   a socket assembled to said case in a snap-in relation therewith and including a stem extending away from said case for connection to a source of fluid pressure to be exposed to said Bourdon tube.

2. A pressure gauge in accordance with claim 1 in which said window includes dial support means extending laterally rearward from the window face and defining a retaining groove for supporting said dial in a generally parallel relation to the face of said window.

3. A pressure gauge in accordance with claim 2 in which said dial includes a central aperture through which said pointer extends for position placement between said window and said dial.

4. A pressure gauge in accordance with claim 3 in which said pointer extends through said dial aperture and is configured in a reverse bend formation behind said dial to in front of said dial.

5. A pressure gauge in accordance with claim 1 in which said socket includes a body, said stem extends away from said body for securing the gauge to a pressure source, there is defined an axial bore extending through said body and stem in which to support an inlet of said Bourdon tube for exposure to said fluid pressure and there is included polygonally shaped wrench flats about said body and said case includes an aperture in a rear wall thereof through which an end of said socket can extend and a coaxially located recess of the same polygonal shape as said wrench flats in which to receive said wrench flats in a rotational interlock with said case.

6. A pressure gauge in accordance with claim 5 in which said polygonal shape is hexagonal.

7. A pressure gauge in accordance with claim 5 in which said socket body at its end entry to said case comprises an annular lip, there is defined an annular recess located contiguously behind said lip and said snap-in assembly between said socket and said case includes interfitting the case wall about said rear aperture in said socket body recess behind said lip.

8. A pressure gauge in accordance with claim 1 in which said window and said case are annular and of a diameter less than about one inch.

9. A pressure gauge in accordance with claim 1 in which said window retaining said dial and said case when assembled in said snap-in relation are arcuately displaceable relative to each other for affecting gauge calibration between said pointer and said dial.

10. A pressure gauge in accordance with claim 1 in which both said window and said case are comprised of a polymeric plastic composition.

* * * * *